United States Patent [19]

Guarnaschelli

[11] 4,297,214

[45] Oct. 27, 1981

[54] AERATOR

[76] Inventor: Claudio Guarnaschelli, 5583 Spruce St., Burnaby, British Columbia, Canada, V5G 1Y7

[21] Appl. No.: 90,525

[22] Filed: Nov. 2, 1979

[30] Foreign Application Priority Data

Feb. 5, 1979 [CA] Canada .................................. 320978

[51] Int. Cl.$^3$ ............................................. C02F 1/74
[52] U.S. Cl. .................................. 210/219; 210/220; 261/87
[58] Field of Search ....................... 210/220, 208, 219; 261/85–88

[56] References Cited

U.S. PATENT DOCUMENTS 3,414,245 12/1968 Frazier ................................. 261/87
3,485,484 12/1969 Quinchon ............................. 261/87
3,948,492 4/1976 Hege ................................. 261/87 X

*Primary Examiner*—Thomas G. Wyse
*Attorney, Agent, or Firm*—Fulwider, Patton, Rieber, Lee & Utecht

[57] ABSTRACT

A submerged aeration apparatus has a hollow shaft extending downwards from the surface of a body of liquid. The hollow shaft is used to transfer surface air or other gases to the body of liquid. An outlet for gas near the bottom end of the shaft is positioned below the surface of the body of liquid. An impeller connected to the shaft near the outlet for gas has an aperture adjacent the shaft for drawing liquid towards the impeller and circulating the liquid past the gas outlet for mixing the liquid with the gas, the impeller then expelling the liquid.

5 Claims, 4 Drawing Figures

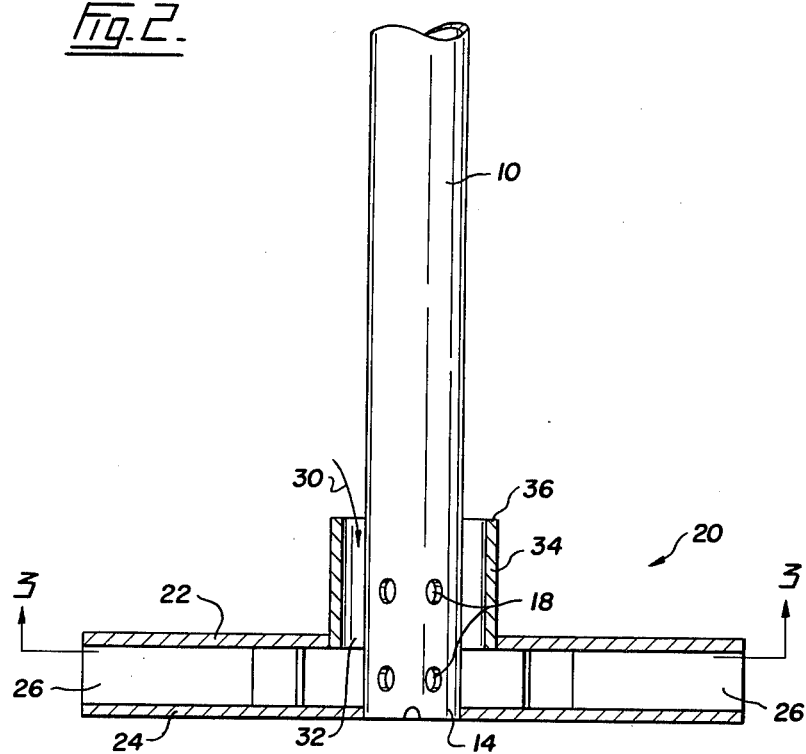
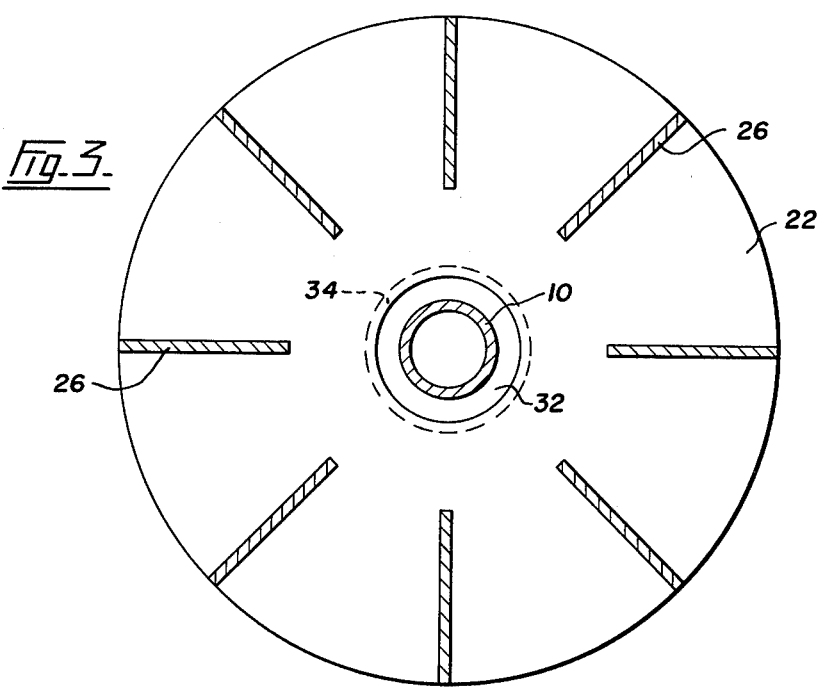

AERATOR

BACKGROUND OF THE INVENTION

This invention relates to a submerged turbine aeration apparatus.

In the past, a number of different devices have been used for the aeration of liquid waste in activated sludge plants. Three typical methods of aeration are diffused aeration, surface aeration and submerged turbine aeration.

The criteria used in evaluating and comparing aeration equipment is discussed in a paper by John R. Stukenberg and Ross E. McKinney in the January, 1966 issue of the Journal WPCF. In this paper, it is pointed out that the oxygen transfer is the greatest when there is a rapid surface change at the air-liquid interface. According to the two-film theory of oxygen transfer, the oxygen is transferred from gas bubbles to the liquid film and is then transferred by diffusion to the bulk liquid.

The most important design parameter for aeration equipment is the oxygen transfer rate coefficient per hour or $K_La$. For standard conditions of one atmosphere pressure and 20° C., the oxygen transfer rate coefficient per hour is referred to as $K_La_{20}$. The value of $K_La$ is determined by plotting the natural log of the oxygen deficit against time. This results in a straight line with a slope equal to the negative value of $K_La$.

In the standard non-steady state method for laboratory testing of aeration equipment, additions of 0.05 mg/l of cobalt chloride are recommended to catalyze the reaction of sodium sulphide with dissolved oxygen in the water.

Employing conventional analysis of data, Stukenberg and McKinney reveal $K_La_{20}$ values of 8.4 for a diffused aerator, 19.3 for a surface aerator, 13.2 for a single submerged turbine and 11.0 for dual submerged turbines.

Aerators and agitators of various types are found in the following U.S. Pat. Nos.

975,380, T. Berntson
3,207,313, K. L. Schulze
3,053,390 F. J. Wood
2,987,186 D. W. Burgoon et al
720,513 T. J. Cheney
1,028,869 A. Fay
3,149,071 D. W. Burgoon et al
1,853,067 O. J. T. G. R. Martin As seen in the Martin patent, it has been known for some time that air can be introduced into the lower impeller portion of an agitator or the like by providing a hollow shaft, apertures in the shaft above the surface of liquid for the intake of air and apertures in the shaft adjacent the impeller where the air is mixed with the liquid. The use of aerators of this general type for treating waste materials is disclosed, for example, in the two Burgoon patents. In these patents, air is drawn through a hollow shaft and discharged through apertures at the ends of the arms of the impeller. However, Burgoon does not provide efficient mixing of the liquid and air because the liquid in his tank is not recirculated past the air outlets, but is drawn only through a sludge-return pipe. In Schulze, air is drawn towards the impeller through a hollow shaft, but, again, there is no adequate means of recirculating the liquid in the tank past the air outlets. Instead, Schulze relies on the outward velocity imparted to the air bubbles. In Wood, air is introduced into the impeller by means of a draft tube. However, Wood introduces the water into the impeller by means of an elbow and conduit connected to the bottom of the impeller. Since the water is introduced in this way, recirculation of the liquid in the tank past the air outlets is considerably restricted.

SUMMARY OF THE INVENTION

The invention provides an apparatus for mixing gases with a body of liquid having a surface, the apparatus comprising a hollow rotatable shaft for extending downwardly from near the surface, the shaft having a top end and a bottom end. An intake for gas near the top end of the shaft is positioned above the surface. An outlet for gas near a bottom end of the shaft is positioned below the surface. An impeller is connected to the shaft near the outlet for gas, the impeller comprising two spaced-apart discs with a plurality of vane elements therebetween and an intake for liquid comprising an aperture adjacent the shaft for admitting the liquid, the impeller drawing liquid through the aperture, past the gas outlet, for mixing the liquid with the gas, and expelling the liquid outwardly from the vane elements as the impeller rotates.

In a preferred form, the intake for liquid is in the top disc. The intake for liquid may comprise an annular opening about the shaft.

When compared with the prior art, the aerator according to the invention provides for a free recirculation of liquid in the tank towards the impeller, past the air outlets and then away from the impeller. When, as preferred, the intake for liquid is in the top disc, the circulation in the tank is set up downwardly along the shaft, outwardly along the bottom of the tank, upwardly along the walls of the tank and then inwardly towards the shaft again. This provides a very complete aeration of the liquid in the tank when compared with the prior art. None of these devices allows such a complete recirculation of liquid past the air outlets for aerating the liquid.

Moreover, the aerator according to the invention is completely portable. It may be positioned anywhere in the tank where more complete aeration is required and additional aerators can be positioned at any time. The sewage treatment aerator shown in the prior art, for example, the patents to Burgoon, Wood and Schulze, are not portable and require permanent installation in the tank. Again, as opposed to the prior art, aerators according to the invention can easily be positioned at different depths in the tank to provide complete aeration throughout.

BRIEF DESCRIPTION OF THE DRAWINGS

In drawings which illustrate embodiments of the invention:

FIG. 2, on the second sheet of drawings, is a sectional view of the aerator taken along line 2—2 of FIG. 1;

FIG. 3 is a sectional view of the aerator taken along section 3—3 of FIG. 2.

DESCRIPTION OF THE PREFERRED EMBODIMENTS

Figure 1:
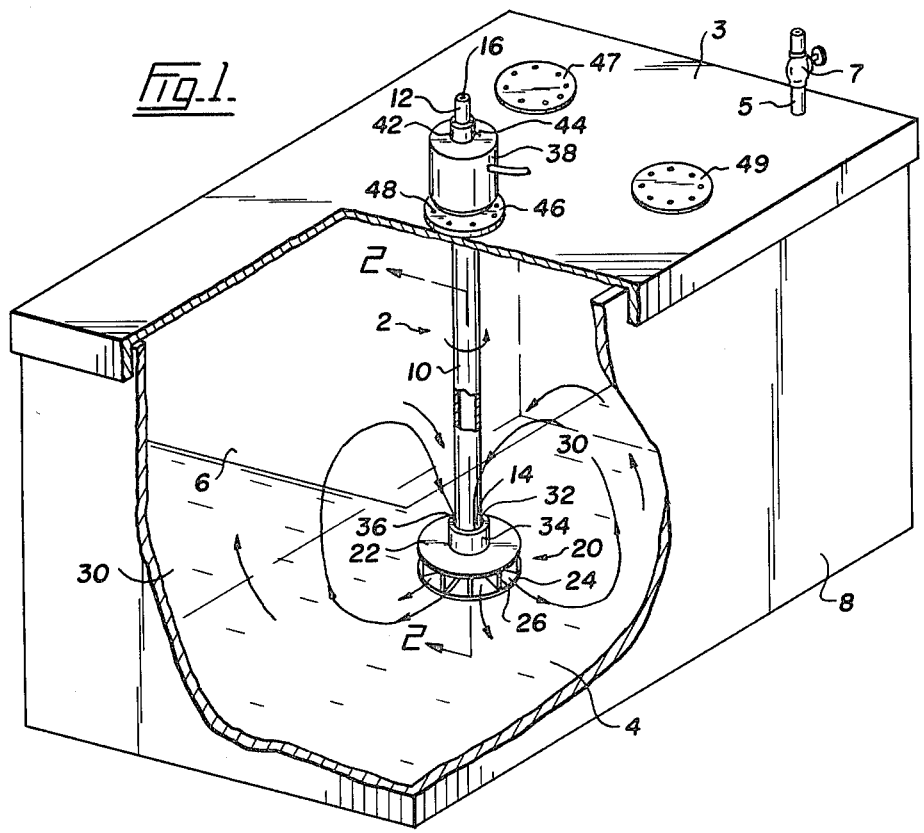
FIG. 1 is an isometric view of an aerator according to the invention positioned within a sewage treatment tank.

In FIG. 1, there is shown an apparatus 2 for adding air or other gases to an enclosed body of liquid 4 contained within a tank 8. The body of liquid has a surface 6. A rectangular cover 3 is tightly filled over the tank 8 and is fitted with a pipe 5 and a valve 7 for the controlled intake of gas or air exhaust.

The apparatus 2 comprises a hollow shaft 10 rotatable about its vertical longitudinal axis. The shaft has a top end 12 and a bottom end 14. An intake for air or other gases near the top end 12 comprises the open upper end 16 of the shaft. An outlet for air or other gases near the bottom end 14 comprises a plurality of apertures 18 in the shaft, as seen in FIG. 2.

The apparatus has an impeller 20 connected to the shaft near the outlet for air 18. The impeller comprises two spaced-apart discs, a top disc 22 and a bottom disc 24, and a plurality of vane elements or blades 26 therebetween. In the embodiment shown, the blades 26 are rectangular in shape and extend radially inwards towards the air outlets 18. Of course, the blades could be alternative shapes, for example trapezoidal or could be replaced by vane means formed in discs 22 and 24 and the vanes can be oriented either radially or tangentially.

The impeller 20 has an intake for liquid 30 adjacent the shaft 10 for admitting liquid into the impeller. The intake for liquid 30 comprises an aperture 32 in the top disc 22 forming an annular opening about the shaft 10 and a tube or water recirculation ring 34. Tube 34 is connected to the top disc 22 about the aperture 32 and extends upwardly towards the top end 12 of the shaft 10. The tube 34 has a top end 36 above the air outlet 18. As seen in FIG. 2, some of the apertures 18 comprising the air outlet are located between the discs 22 and 24 and some are located between the top of disc 22 and the top end 36 of the tube 34.

As seen in FIG. 1, an electric motor 38 is provided for rotating the shaft 10 and impeller 20. The motor 38 has a hollow drive shaft 42 fitted over the hollow shaft 10 and secured thereto by a set screw 44. Motor 38 is secured to cover 3 by means of a flange 46 and a plurality of bolts 48. It can be seen that the position of aerator 2 in the tank 8 can be varied by moving it to the alternative openings fitted with covers 47 and 49 at any desired positions. In order to raise the aerator 2 to different heights in the tank 8, it is simply necessary to loosen set screw 44, raise or lower the hollow shaft 10 and then retighten the set screw.

In operation, power is supplied to motor 38 to rotate shaft 10 and impeller 20. The blades or vane elements 26 of the impeller force the water initially inside the hollow shaft 10 and between the discs 22 and 24 outwardly along the bottom of the tank 8. As the water is expelled, this causes air to be drawn downwardly through hollow shaft 10 from the air intake 16 to the air outlet 18. Additionally, water is drawn downwardly through tube 34 and aperture 32. As the liquid is drawn downwardly through intake 30, it is forced past the air outlet 18 where the liquid is mixed with air. The aerated liquid is then forced outwardly by the blades 26, creating small bubbles by shear, thus establishing a recirculation pattern within the liquid. The liquid forced outwardly by blades 26 moves along the bottom of the tank 8 and circulates upwardly as it approaches the walls of the tank. Upon approaching the surface 6, the liquid circulates towards the shaft 10 and then downwardly towards the impeller 20. The liquid in the tank is continuously recirculated past the air outlets of the aerator so it is thoroughly aerated.

Figure 4:
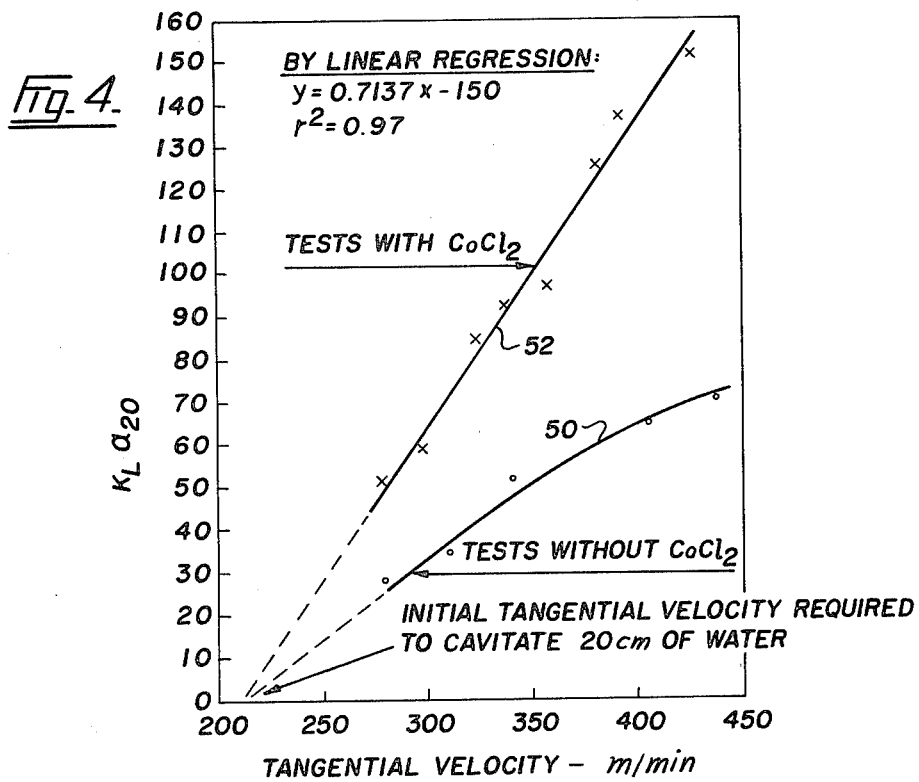
FIG. 4, on the first sheet of drawings, is a graphical diagram where the oxygen transfer rate of the aerator of FIG. 1 is plotted against the tangential velocity of the impeller.

Referring to FIG. 4, this diagram shows the results of actual tests conducted with the aerator of FIGS. 1 to 3, in a 35 liter rectangular glass tank. As indicated by curve 50, where ordinary tap water was used, $K_La_{20}$ values of 28 to 70 were obtained. Curve 52 was conducted with the same equipment and with 0.05 mg/l of cobalt chloride added to the tap water as a catalyst. In this case, $K_La_{20}$ values of 50 to 150 per hour were obtained depending on the peripheral velocity of the rotor. When cobalt chloride is used as a catalyst as seen for curve 52, a straight line relationship exists between the $K_La_{20}$ and the tangential velocity of the impeller blades.

The large values of the mass transfer coefficient are attributed to: (1) the high shearing characteristics and microturbulence of the impeller; (2) an increase in the partial pressure of oxygen proportional to the hydrostatic pressure of water above the rotor; (3) the very large surface area of the small air bubbles; and (4) the extended residence time of the rising air bubbles.

What is claimed is:

1. An apparatus for mixing gases with a body of liquid having a surface, the apparatus comprising:
    a hollow rotatable surface for extending downwardly from near the surface, the shaft having a top and a bottom end, said bottom end having apertures formed therethrough;
    an intake for gas near the top end of the shaft for positioning above the surface;
    an impeller connected to the shaft near the outlet for gas, the impeller comprising two spaced-apart discs with a plurality of vane elements therebetween;
    an annular opening in a top said disc about the shaft;
    a tube connected to the top disc and extending towards the top end of the shaft, above the annular opening;
    a mixing zone for the gas and the liquid defined adjacent the exterior of the apertured bottom end of the shaft, the interior of the tube and a central portion of the impeller, surrounding the shaft;
    an outlet for gas near the bottom end of the shaft within the mixing zone defined by said apertures formed through said shaft bottom end;
    the impeller drawing liquid through the tube, through the opening past the gas outlet, for mixing the liquid with the gas in the mixing zone, and expelling the liquid outwardly from the vane elements as the impeller rotates.

2. An apparatus as claimed in claim 1, the impeller comprising a plurality of blades extending between the top disc and the bottom disc and inwardly towards the outlet for gas, the blades drawing liquid downwardly through the intake for liquid, past the gas outlet, and then expelling the liquid outwardly from the impeller as the shaft rotates.

3. An apparatus as claimed in claim 2, the intake for gas comprising said top end of the shaft.

4. An apparatus as claimed in claim 2, comprising a motor for rotating the shaft connected near the top end of the shaft.

5. An apparatus as claimed in claim 4, the intake for air comprising a hollow drive shaft motor.

* * * * *